United States Patent [19]
Sato et al.

[11] 3,966,399
[45] June 29, 1976

[54] AZO DISPERSE DYE MIXTURES

[75] Inventors: Katsunobu Sato, Minoo; Yoshihisa Sueda, Toyonaka; Yoshiro Izutsutani, Osaka; Kunihiko Imada, Toyonaka; Katsumasa Ohtake, Nara, all of Japan

[73] Assignee: Sumitomo Chemical Company, Limited, Osaka, Japan

[22] Filed: Apr. 9, 1973

[21] Appl. No.: 349,578

[30] Foreign Application Priority Data
Apr. 7, 1972 Japan.............................. 47-35325
Apr. 7, 1972 Japan.............................. 47-35326

[52] U.S. Cl............................................ 8/26; 8/41 C
[51] Int. Cl.²........................................ D06P 1/18
[58] Field of Search.......................... 8/26; 260/207

[56] References Cited
FOREIGN PATENTS OR APPLICATIONS
1,511,934 12/1967 France............................ 260/207.1

OTHER PUBLICATIONS
Sumner, J. Soc. Dyes & Col., May 1965, No. 5, 8/25, pp. 193–200.

*Primary Examiner*—Donald Levy
*Attorney, Agent, or Firm*—Sughrue, Rothwell, Mion, Zinn & Macpeak

[57] ABSTRACT

A mixture of at least two members selected from the group consisting of compounds represented by the formula,

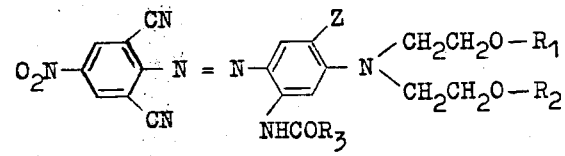

wherein Z represents hydrogen atom or methyl, ethyl, methoxy or ethoxy group, each $R_1$ and $R_2$ represents methyl or ethyl group, $R_3$ represents methyl, ethyl or phenyl group or a phenyl group substituted by methyl, ethyl, methoxy or ethoxy group. The mixture is useful for dyeing hydrophobic fibers such as polyester fibers, and has good dyeabilities, particularly, build-up property.

10 Claims, No Drawings

AZO DISPERSE DYE MIXTURES

This invention relates to novel dyestuffs suitable for dyeing hydrophobic fibers, particularly polyester fibers.

More particularly, the invention relates to novel mixed dyestuffs with good dyeabilities, such as build-up property.

Heretofore, an improvement has been attained on the dyeing power by mixing two or more dyestuffs due to the mixture effect thereof, however, the obtained dyeing power is not sufficient. It has hitherto been unknown that the dyeing power would be improved about two times or more by mixing two or more dyestuffs, as compared with the case where the individual dyestuff is used singly.

The inventors have zealously studied and have at last found that when a mixture of at least two members selected from the group consisting of novel dyestuffs is used for dyeing hydrophobic fibers, unexpected results are exhibited on the dyeabilities such as build-up property, fastness and temperature sensitivity.

The present invention is to provide a mixture of at least two members selected from the group consisting of compounds represented by the formula (I), $$O_2N-\underset{\underset{CN}{|}}{\overset{\overset{CN}{|}}{C_6H_2}}-N=N-\underset{\underset{NHCOR_3}{|}}{\overset{\overset{Z}{|}}{C_6H_2}}-N\underset{CH_2CH_2O-R_2}{\overset{CH_2CH_2O-R_1}{<}} \quad (I)$$

wherein Z represents hydrogen atom or methyl, ethyl, methoxy or ethoxy group, each $R_1$ and $R_2$ represents methyl or ethyl group, $R_3$ represents methyl, ethyl or phenyl group or a phenyl group substituted by methyl, ethyl, methoxy or ethoxy group.

According to one embodiment of the present invention, new mixed dyestuffs are prepared by mixing two or more compounds of the following formula:

$$O_2N-\underset{\underset{CN}{|}}{\overset{\overset{CN}{|}}{C_6H_2}}-N=N-\underset{\underset{NHCOR_3}{|}}{\overset{\overset{Z}{|}}{C_6H_2}}-N\underset{CH_2CH_2O-R_2}{\overset{CH_2CH_2O-R_1}{<}} \quad (I)$$

wherein $R_1$, $R_2$, $R_3$ and Z are as defined above.

Another embodiment of the present invention is to prepare the mixed dyestuff, by reacting a mixture of at least two members of the following formula (II), $$O_2N-\underset{\underset{Y}{|}}{\overset{\overset{X}{|}}{C_6H_2}}-N=N-\underset{\underset{NHCOR_3}{|}}{\overset{\overset{Z}{|}}{C_6H_2}}-N\underset{CH_2CH_2O-R_2}{\overset{CH_2CH_2O-R_1}{<}} \quad (II)$$

wherein $R_1$, $R_2$, $R_3$ and Z are as defined above, X represents chlorine or bromine atom or cyano group, and Y represents chlorine or bromine atom, with a metal cyanide, preferably a compound capable of forming cuprous cyanide, in an organic solvent, to substitute the halogen atoms in the ortho-positions to the azo group by the cyano groups.

The compounds of the formula (II) can be prepared easily by reacting the corresponding diazotized p-nitroaniline with the corresponding N,N-di-($\beta$-substituted-ethyl)-m-acylaminoaniline according to the conventional method.

The diazo components which are suitable for the synthesis of the starting compound (II) of the present invention are, for example, 2-cyano-4-nitro-6-bromo-aniline, 2-cyano-4-nitro-6-chloro-aniline, 2,6-dibromo-4-nitro-aniline, 2,6-dichloro-4-nitro-aniline, 2-bromo-4-nitro-6-chloro-aniline, etc.

The coupling components are as follows:

N,N-di-($\beta$-methoxyethyl)-m-acetylamino-aniline,
N,N-di-($\beta$-ethoxyethyl)-m-acetylamino-aniline,
N,N-di-($\beta$-methoxyethyl)-m-propionylamino-aniline,
N,N-di-($\beta$-ethoxyethyl)-m-propionylamino-aniline,
N,N-di-($\beta$-methoxyethyl)-m-benzoylamino-aniline,
N,N-di-($\beta$-ethoxyethyl)-m-benzoylamino-aniline,
N,N-di-($\beta$-methoxyethyl)-2-methoxy-5-acetylamino-aniline,
N,N-di-($\beta$-ethoxyethyl)-2-methoxy-5-acetylamino-aniline,
N,N-di-($\beta$-methoxyethyl)-2-ethoxy-5-acetylamino-aniline,
N,N-di-($\beta$-ethoxyethyl)-2-ethoxy-5-acetylamino-aniline,
N,N-di-($\beta$-methoxyethyl)-2-methyl-5-acetylamino-aniline, N,N-di-($\beta$-ethoxyethyl)-2-ethyl-5-acetylamino-aniline,
N,N-di-($\beta$-methoxyethyl)-2-methoxy-5-propionylamino-aniline,
N,N-di-($\beta$-ethoxyethyl)-2-methoxy-5-propionylamino-aniline,
N-($\beta$-methoxyethyl)-N-($\beta$-ethoxyethyl)-m-acetylamino-aniline, N,N-di-($\beta$-methoxyethyl)-m-(p'-methoxy)-benzoylamino-aniline,
N,N-di-($\beta$-ethoxyethyl)-m-(p'-methyl)-benzoylamino-aniline, etc.

In carrying out the aforesaid cyanogenation, the starting compound of the formula (II) may be used in the reaction in the form of a paste, preferably in the form of a dry state, and the preferred organic solvents are polar aprotic solvents such as dimethyl formamide, dimethyl sulfoxide, dimethyl acetamide, pyridine, N-methyl pyrrolidone, quinoline, acetonitrile, benzonitrile, etc. In addition, the presence of a small amount of water does not interfere with the reaction.

Preferred metal cyanides are cuprous cyanide, silver cyanide, lead cyanide, zinc cyanide, potassium ferrocyanide, calcium ferrocyanide, copper ferrocyanide, etc., and above all, the cuprous cyanide is particularly valuable as having excellent high activity.

The cuprous cyanide may be formed in the reaction solvent by adding an alkali metal cyanide and an appropriate cupric salt such as cupric sulfate or cupric acetate in the reaction mixture. The reaction temperature may be broadly varied, and depends upon the used organic solvent and the structures of the starting compound (II). In general, the reaction temperature is about 20° – 220°C, preferably 25° – 150°C.

The reaction is carried out by dissolving the starting compound (II) in the organic solvent together with the metal cyanide, preferably cuprous cyanide or a compound capable of forming cuprous cyanide, and if necessary, by heating the reaction mixture. The proceeding of the reaction may be traced by means of a thin layer chromatography. The reaction products may be obtained in the form of crystals by cooling the reaction mixture or by depositing with water and thereafter by filtering out the formed crystals.

The excess metal cyanide such as cuprous cyanide or the metal halide may be separated from the formed reaction product according to the conventional method, for example, by converting the same into a water soluble complex salt by the aid of ammonium cyanide or an alkali metal, or by oxidizing the cuprous salt to form a water soluble cupric salt for example by means of ferric chloride.

The manufacture of the mixed dyestuffs of the present invention may also be performed apart from the above mentioned embodiments, by reacting the diazo component and two or more coupling components and then to substitute the halogen groups in the formed compounds by cyano groups.

The mixed dyestuffs obtained by the present invention can impart a distinct blue dyeing to polyester fiber materials, which is excellent in temperature sensitivity and various kinds of fastness such as light fastness, sublimation fastness, potting fastness, etc., and the dyeing power can be improved by the use of the mixed dyestuffs of the present invention due to the unexpected excellent mixture effect thereof. In fact, the dyeing power of the present mixed dyestuffs is about two or more times as strong as that of the individual dyestuff. This mixture effect is unexpectedly excellent and the result is quite surprising.

As mentioned above, any sufficient improvement has not hitherto been attained on the increase of the dyeing power, and under such technical background, the mixed dyestuffs of the present invention are quite advantageous and useful from the industrial and commercial view-points.

Accordingly, the present invention also provides a method for dyeing or printing hydrophobic fiber materials in a distinct, fast and deep blue shade, by using the mixed dyestuff of the present invention.

The mixing proportion of the dyestuffs may be optionally varied, and it is preferable that one of them occupies about 20% to 80% by weight of the whole composition. With respect to the combination of the dyestuffs, different dyestuffs each having different structures are preferably combined as shown in the examples hereunder given. In particular, the cases of Z = hydrogen or methoxy group, and $R_3$ = methyl group or phenyl group are very preferable, in that the improvement on the dyeing power is remarkable in the cases due to the mixture effect thereof.

Now, the remarkable effect of the present invention will be explained in the following experiments. Dyestuffs used:

No.  Formula (1) $O_2N\text{-}\underset{CN}{\overset{CN}{\diagdown}}\text{-}N=N\text{-}\underset{NHCO\text{-}\phi}{\diagdown}\text{-}N\underset{CH_2CH_2OCH_3}{\overset{CH_2CH_2OCH_3}{\diagup}}$ (2) $O_2N\text{-}\underset{CN}{\overset{CN}{\diagdown}}\text{-}N=N\text{-}\underset{NHCOCH_3}{\diagdown}\text{-}N\underset{CH_2CH_2OCH_3}{\overset{CH_2CH_2OCH_3}{\diagup}}$ (3) $O_2N\text{-}\underset{CN}{\overset{CN}{\diagdown}}\text{-}N=N\text{-}\underset{NHCO\text{-}\phi}{\diagdown}\text{-}N\underset{CH_2CH_2OC_2H_5}{\overset{CH_2CH_2OC_2H_5}{\diagup}}$ (4) $O_2N\text{-}\underset{CN}{\overset{CN}{\diagdown}}\text{-}N=N\text{-}\underset{NHCOCH_3}{\overset{OCH_3}{\diagdown}}\text{-}N\underset{CH_2CH_2OCH_3}{\overset{CH_2CH_2OCH_3}{\diagup}}$

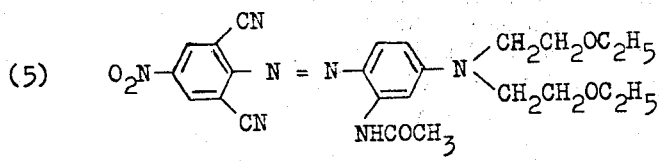

The determination of the dyeing power was carried out according to the colorimetric determination method where the dyed material (100 parts of polyester fiber) was dipped in hexafluoroisopropanol to extract the dyestuffs and the concentration of the dyestuffs extracted was measured. The improvement on the dyeing power due to the mixture effect was calculated according to the following equation:

$$\text{Improvement on the dyeing powder due to the mixture effect (\%)} = \frac{\left(\begin{array}{c}\text{Actual dyeing power of}\\\text{the mixed dyestuff}\end{array}\right) - \left(\begin{array}{c}\text{Apparent dyeing power of}\\\text{a single dyestuff}\end{array}\right)}{(\text{Apparent dyeing power of a single dyestuff})} \times 100$$

Results are shown in the following Table 1.

Table 1

| Experiment No. | Dyestuff No. | Actual dyeing power | Apparent dyeing power of a single dyestuff | Improvement on the dyeing power due to mixture effect |
|---|---|---|---|---|
| I | (1) 1.2 parts | 100.0% | | |
|  | (2) 2.6 | 102.0 | | |
|  | | | 101.0% | 91.9% |
|  | + { (1) 0.6 | 193.8 | | |
|  |     (2) 1.3 | | | |
| II | (2) 2.6 parts | 100.0% | | |
|  | (3) 1.8 | 99.0 | | |
|  | | | 99.5% | 87.5% |
|  | + { (2) 1.3 | 186.5 | | |
|  |     (3) 0.9 | | | |
| III | (4) 2.6 parts | 100.0% | | |
|  | (2) 1.6 | 87.5 | | |
|  | | | 93.8% | 133.5% |
|  | + { (4) 1.3 | 219.0 | | |
|  |     (2) 0.8 | | | |
| IV | (3) 4.0 parts | 100.0% | | |
|  | (5) 1.0 | 111.2 | | |
|  | | | 105.6% | 77.6% |
|  | + { (3) 2.0 | 187.5 | | |
|  |     (5) 0.5 | | | |

Further, Experiment I was repeated except that the dyeing was carried out in a dyeing concentration of 3% o.w.f., more concretely, a mixture of 0.95 part of a dyestuff (1) and 2.05 parts of a dyestuff (2) was used, whereby the improvement due to the mixture effect was 163.5%.

Accordingly, it can be said that the improvement due to the mixture effect can be increased with the increase of a dyeing concentration.

In addition, these mixed dyestuffs also are suitably used for the coloring of synthetic resins such as polyethylene or polystyrene, and on the other hand, are suitable for a solvent dyeing.

The mixed dyestuffs of the present invention are pulverized into fine particles in an aqueous medium together with a pertinent dispersant, when being used for the dyeing or printing of hydrophobic fibers. The dispersed dyestuff compositions are preferably used in the form of a paste or in the form of powders by means of a spray drying method. The thus obtained dyestuffs are advantageously used in an aqueous medium wherein fibers are immersed, under pressure at above 105°C, preferably 110° – 140°C. In addition, the dyeing solvent printing also is possible where the printing is may be carried out in the presence of a carrier such as o-phenyl-phenol, trichloro-benzene or the like, at relatively high temperature, for example in the boiling state of water. Or otherwise, the dyeing may also be carried out by means of a so-called thermosol process, by padding the dyestuff dispersion to a fabric and then subjecting the thus treated fabric to dry heat treatment for from 30 seconds to 1 minute at 150° – 230°C. As to the procedure of printing, the dyestuff dispersion is kneaded together with a pertinent printing paste, and the thus formed dyestuff printing paste is padded to a fabric, and then the thus padded fabric is subjected to steaming or is treated by a thermosol process, whereby the printing is attained. Apart from this, a so-called carried out in a printing bath containing as the main solvent of the printing bath an organic solvent such as trichloroethylene, perchloroethylene or the like.

Now the present invention will be explained in more detail by the following examples, which, however, do not whatsoever limit the scope of the present invention. The "part" shows "part by weight" hereunder.

EXAMPLE 1

24.2 parts of 2-cyano-4-nitro-6-bromo-aniline were added to 157 parts of nitrosylsulfuric acid (prepared by adding 7.2 parts of sodium nitrite to 150 parts of concentrated sulfuric acid), stirred at below 5°C for 2 hours, and then were added dropwise in a solution consisting of 9.5 parts of N,N-di-(β-methoxyethyl)-m-benzoylamino-aniline, 18.9 parts of N,N-di-(β-methoxyethyl)-m-acetylamino-aniline and 200 parts of 50% aqueous methanol, in the course of 30 minutes at below 5°C.

The formed dyestuffs were separated by filtration, washed with water until the filtrate was neutralized and then dried, whereby 48.2 parts of blue-brown crystals were obtained. It was determined from the data on the corresponding thin layer chromatography, elementary analysis and infrared ray absorption spectra that the obtained crystals consist of a mixture of the following dyestuffs (a)(b):

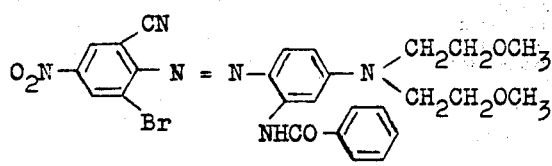

(a)

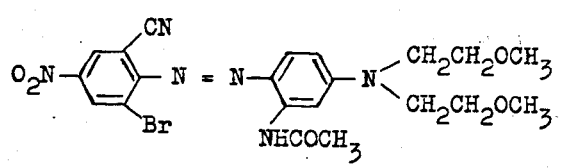

(b)

48.2 parts of the above mentioned dyestuffs were dissolved in 240 parts of pyridine, and 8.1 parts of cuprous cyanide were added thereto. After being stirred at 110° – 120°C for 2 hours, the resulting mixture was left for cooling, and then was further stirred at 10° – 20°C for more 1 hour under cooling. Afterwards, the formed precipitates were separated by filtration, washed with 200 parts of methanol and then with 200 parts of water, and dried whereby 39.1 parts of green-blue crystals were obtained. It was determined from the data on the corresponding thin layer chromatography, elementary analysis and infrared ray absorption spectra that the obtained crystals consist of a mixture of the following dyestuffs (1)(2):

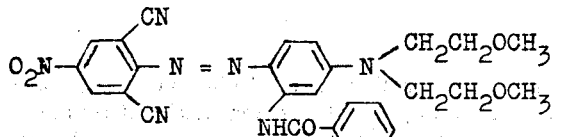

(1)

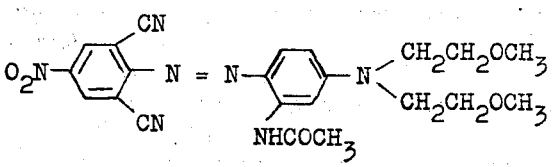

(2)

The dyestuff mixture (formula (1) : formula (2) = 0.32 : 0.68) was pulverized into fine particles in an aqueous solvent in the presence of a dispersant and thereafter used for the dyeing of polyethylene terephthalate fibers where excellent distinct blue dyeing was obtained having excellent fastness to light, sublimation, washing, etc. The dyeing power was remarkably excellent and high, as compared with the case where the single dyestuff was used.

EXAMPLE 2

24.2 parts of 2-cyano-4-nitro-6-bromo-aniline were added to 157 parts of nitrosylsulfuric acid (prepared by adding 7.2 parts of sodium nitrite to 150 parts of concentrated sulfuric acid), and then stirred at below 5°C for 2 hours. Afterwards, the reaction mixture were divided equally into two parts and each of these two parts was added dropwise in a solution consisting of 16.8 parts of N,N-di-(β-methoxyethyl)-m-acetylamino-aniline and 100 parts of 50% aqueous methanol, and a solution consisting of 13.1 parts of N,N-di-(β-ethoxyethyl)-m-benzoylamino-aniline and 100 parts of 50% aqueous methanol, respectively, each in the course of 30 minutes at below 5°C. The formed dyestuffs were separated by filtration, washed with water until the filtrate was neutralized and dried, whereby blue-brown crystals, that is 29.5 parts of the following dyestuff (b) and 20.1 parts of the following dyestuff (c), were obtained.

It was determined from the data on the corresponding elementary analysis and infrared ray absorption spectra that these dyestuffs have the following structures, respectively:

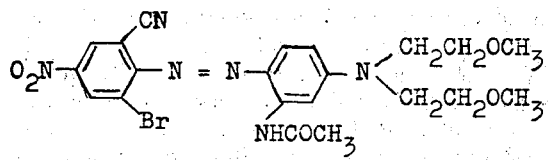 (b)

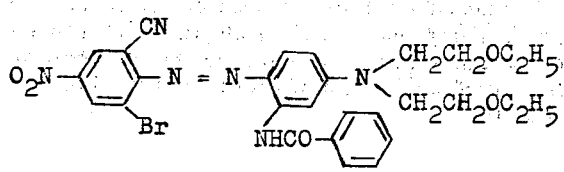 (c)

29.5 parts of the above dyestuff (b) and 20.1 parts of the above dyestuff (c) were dissolved in 240 parts of pyridine, and 8.1 parts of cuprous cyanide were added thereto, and after stirred for 2 hours at 110° – 115°C and left for cooling, further stirred for more 1 hour at 10° – 20°C under cooling. Afterwards, the formed precipitates were separated by filtration, washed with 200 parts of methanol and then with 200 parts of water and then dried, whereby 40.4 parts of green-blue crystals were obtained. It was determined from the data on the corresponding thin layer chromatography, elementary analysis and infrared ray absorption spectra that the obtained crystals consist of a mixture of the following dyestuffs:

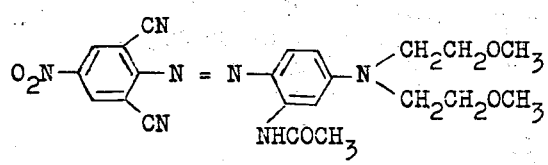 (2)

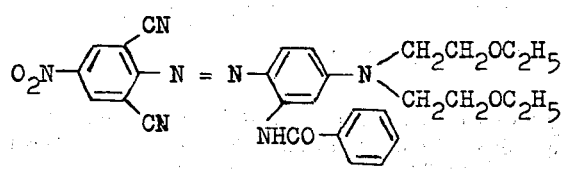 (3)

The dyestuff mixture (formula (2) : formula (3) = 0.59 : 0.41) was pulverized into fine particles in an aqueous solvent in the pressure of a dispersant and then used for the dyeing of polyethylene terephthalate fibers where a distinct blue dyeing was obtained having excellent fastness to light, sublimation, washing, etc. The dyeing power was remarkably excellent and high, as compared with the case where the single dyestuff was used.

EXAMPLE 3

29.6 parts of 2,6-dibromo-4-nitro-aniline were added to 157 parts of nitrosylsulfuric acid (prepared by adding 7.2 parts of sodium nitrite to 150 parts of concentrated sulfuric acid), stirred for 2 hours at 20° – 30°C, and then added dropwise to a solution consisting of 17.9 parts of N,N-di-(β-methoxyethyl)-2-methoxy-5-acetylamino-aniline, 10.5 parts of N,N-di-(β-methoxyethyl)-m-acetylamino-aniline and 200 parts of 50% aqueous methanol, at below 5°C in the course of 30 minutes. The formed dyestuffs were separated by filtration, washed with water until the filtrate was neutralized and dried, whereby 53.2 parts of brown crystals were obtained.

It was determined that the obtained crytals consist of a mixture of the following dyestuffs, from the data on the corresponding thin layer chromatography, elementary analysis and infrared ray absorption spectra.

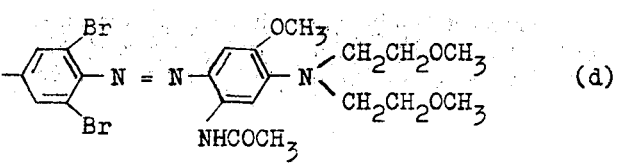 (d)

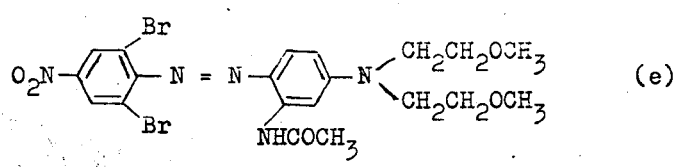 (e)

53.2 parts of the above dyestuffs were dissolved in 240 parts of pyridine, and 16.2 parts of cuprous cyanide were added thereto. After being stirred for 2 hours at 100° – 110°C, the reaction mixture was left for cooling and then further stirred for more 1 hour at 10° – 20°C under cooling. Afterwards, the formed precipitates were separated by filtration, washed with 200 parts of methanol and then with 200 parts of water and dried, whereby 39.2 parts of green-blue crystals were obtained.

It was determined from the data on the corresponding thin layer chromatography, elementary analysis and infrared ray absorption spectra, that the obtained crystals consist of a mixture of the following dyestuffs:

trated sulfuric acid), stirred for 2 hours at 20° – 30°C and then added dropwise to a solution consisting of 27.6 parts of N,N-di-(β-ethoxyethyl)-m-benzoylamino-aniline, 6.5 parts of N,N-di-(β-ethoxyethyl)-m-acetylamino-aniline and 200 parts of 50% aqueous methanol, at below 5°C in the course of 30 minutes. The formed dyestuffs were separated by filtration, washed with water until the filtrate was neutralized, and then dried, whereby 58.3 parts of brown crystals were obtained. It was determined from the data on the corresponding thin layer chromatography, elementary analysis and infrared ray absorption spectra that the obtained crystals consist of a mixture of the following dyestuffs:

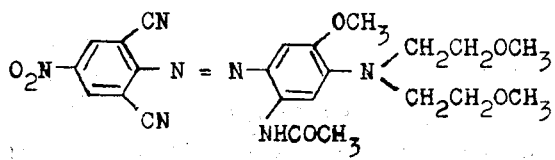

(4)

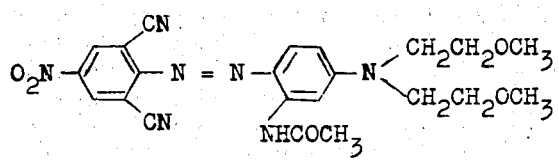

(2)

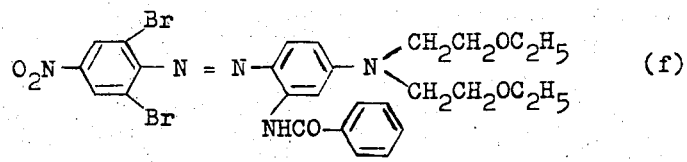

(f)

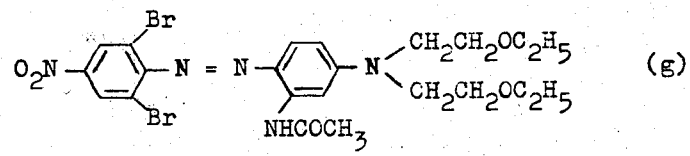

(g)

The dyestuff mixture (formula (4) : formula (2) = 0.62 : 0.38) was pulverized into fine particles in an aqueous solvent in the presence of a dispersant and thereafter used for the dyeing of polyethylene terephthalate fibers where excellent distinct blue dyeing was obtained having excellent fastness to light, sublimation, washing, etc. The dyeing power was remarkably excellent and high, as compared with the case where the single dyestuff was used.

EXAMPLE 4

29.6 parts of 2,6-dibromo-4-nitro-aniline were added to 157 parts of nitrosylsulfuric acid (prepared by adding 7.2 parts of sodium nitrite to 150 parts of concen- 58.3 parts of the above dyestuffs were dissolved in 240 parts of dimethylformamide, and 16.2 parts of cuprous cyanide were added thereto. After being stirred at 90° – 100°C for 2 hours, the mixture was left for cooling, and further stirred for more 1 hour at 10° – 20°C under cooling. Afterwards, the obtained precipitates were separated by filtration, washed with 200 parts of methanol and then with 200 parts of water, and dried, whereby 43.8 parts of green-blue crystals were obtained.

It was determined from the data on the corresponding thin layer chromatography, elementary analysis and infrared ray absorption spectra that the obtained crystals consist of a mixture of the following dyestuffs:

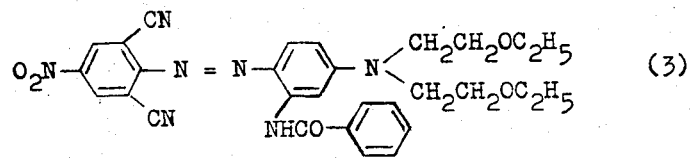

(3)

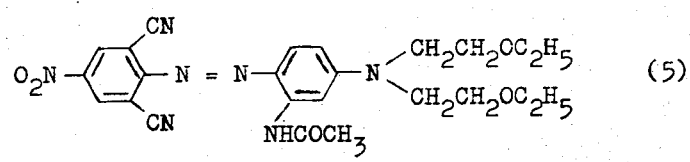

(5)

The mixture dyestuff (formula (3) : formula (5) = 4 : 1) was pulverized into fine particles in an aqueous solvent in the presence of a dispersant, and thereafter used for the dyeing of polyethylene terephthalate fibers where excellent distinct blue dyeing was obtained having excellent fastness to light, sublimation, washing, etc. The dyeing power was remarkably excellent and high, as compared with the case where the single dyestuff was used.

EXAMPLE 5

The following dyestuffs were mixed in a weight ratio of formula (1) : formula (2) = 4 : 6, to obtain a mixture dyestuff composition:

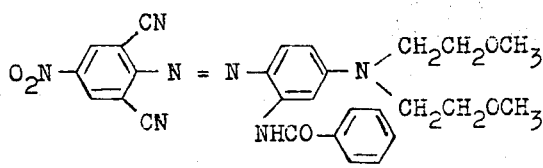
(1)

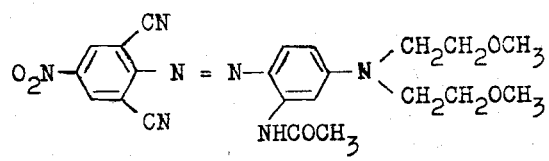
(2)

The thus obtained mixture dyestuff composition was pulverized into fine particles in an aqueous solvent in the presence of a dispersant. By using the pulverized composition, polyethylene terephthalate fibers were dyed where a distinct blue dyeing having excellent fastness was obtained. The dyeing power in the above case was about two times as high as the case where the single dyestuff (1) or the single dyestuff (2) was used individually.

EXAMPLE 6

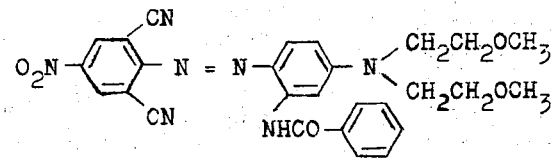
(1)

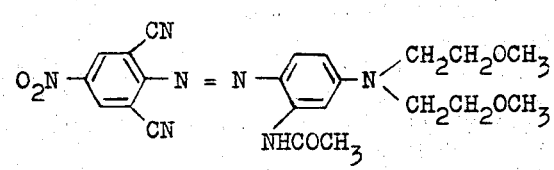
(2)

0.6 parts of the above dyestuff (1) and 1.3 parts of the above dyestuff (2) were pulverized into fine particles together with 3.8 parts of condensation product of naphthalene-β-sulfonic acid and formaldehyde and these were uniformly dispersed into 3,000 parts of aqueous solution containing 3.0 parts of higher alcohol sulfate to prepare a dye bath. In the next place, 100 parts of Tetoron Spun yarn (polyester fiber, manufacturer: Toray KK) were immersed in the thus prepared dye bath, and the dyeing was performed for 60 minutes at 130°C while stirring in a pressure container. Afterwards, the dyed yarn was subjected to reduction and washing treatment for 10 minutes at 85°C by using 3,000 parts of an aqueous solution containing 3 parts of sodium hydroxide, 3 parts of hydrosulfide and 3 parts of betain-type amphoteric surfactant, and then washed with water and dried whereby a distinct and fast blue dyeing of extremely high concentration was obtained. For comparison, 1.2 parts of the above dyestuff (1) were pulverized into fine particles together with 2.4 parts of naphthalene-β-sulfonic acid-formaldehyde condensation product, and the dyeing was performed under the same conditions as in the above procedure; and 2.6 parts of the above dyestuff (2) were pulverized into fine particles together with 5.2 parts of naphthalene-β-sulfonic acid-formaldehyde condensation product, and the dyeing was performed also under the same conditions as in the above procedure. The results of these three cases were compared with one another, and are shown in the following Table 2.

Table 2

| No. | Dyestuff No. | | Dyeing power |
|---|---|---|---|
| 1 | (1) | 1.2 parts | 100.0% |
|   | (2) | 2.6 | 102.0 |
|   | (1) | 0.6 | 193.8 |
| + | (2) | 1.3 | |

EXAMPLE 7

(2)

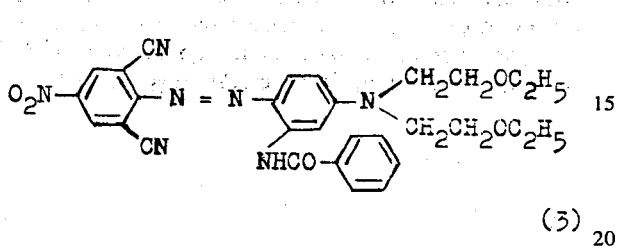

(3)

1.3 parts of the above dyestuff (2) and 0.9 parts of the above dyestuff (3) were pulverized into fine particles together with 4.4 parts of naphthalene-β-sulfonic acid-formaldehyde condensation product, and the dyeing was performed under the same conditions as in Example 6, whereby a distinct and fast dyeing of extremely high concentration was obtained. For comparison, the single dyeing was performed by using each of the dyestuffs (1) and (2), respectively, also under the same conditions as in Example 6. The results of these three cases were compared with one another and are shown in the following Table 3.

Table 3

| No. | Dyestuff No. | | Dyeing power |
|---|---|---|---|
| II | (2) | 2.6 parts | 100.0% |
|  | (3) | 1.8 | 99.0 |
| + | (2) | 1.3 |  |
|  | (3) | 0.9 | 186.5 |

EXAMPLE 8

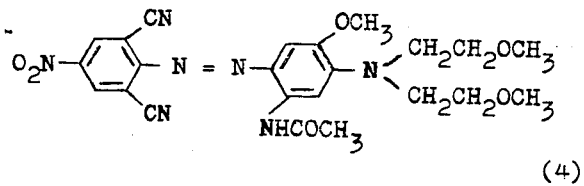

(4)

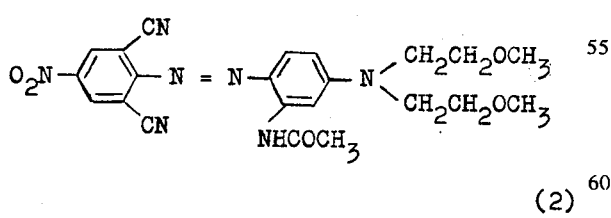

(2)

1.3 parts of the above dyestuff (4) and 0.8 part of the above dyestuff (2) were pulverized into fine particles together with 4.2 parts of naphthalene-β-sulfonic acid-formaldehyde condensation product, and the dyeing was performed under the same conditions as in Example 6, whereby a distinct and fast dyeing of extremely high concentration was obtained. For comparison, the single dyeing was performed by using each of the dyestuffs (4) and (2), respectively, also under the same conditions as in Example 6. The results of these three cases were compared with one another and are shown in the following Table 4.

Table 4

| No. | Dyestuff No. | | Dyeing power |
|---|---|---|---|
| III | (4) | 2.6 parts | 100.0% |
|  | (2) | 1.6 | 87.5 |
| + | (4) | 1.3 |  |
|  | (2) | 0.8 | 219.0 |

EXAMPLE 9

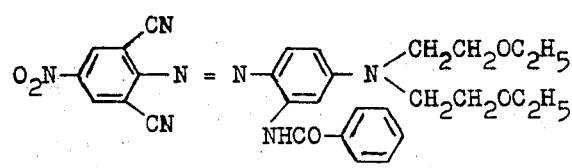

(3)

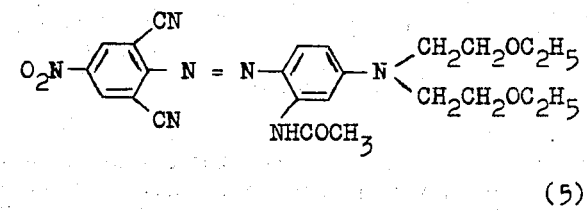

(5)

2.0 parts of the above dyestuff (3) and 0.5 part of the above dyestuff (5) were pulverized into fine particles together with 5.0 parts of naphthalene-β-sulfonic acid-formaldehyde condensation product, and the dyeing was performed under the same conditions as in Example 6, whereby a distinct and fast dyeing of extremely high concentration was obtained. For comparison, the single dyeing was performed by using each of the dyestuffs (3) and (5), respectively, also under the same conditions as in Example 6. The results of these three cases were compared with one another and are shown in the following Table 5:

Table 5

| No. | Dyestuff No. | | Dyeing power |
|---|---|---|---|
| IV | (3) | 4.0 parts | 100.0% |
|  | (5) | 1.0 | 111.2 |
| + | (3) | 2.0 |  |
|  | (5) | 0.5 | 187.5 |

While the invention has been described in detail and with reference to specific embodiments thereof, it will be apparent to one skilled in the art that various changes and modifications can be made therein without departing from the spirit and scope thereof.

What is claimed is:

1. A mixture of at least two members selected from the group consisting of compounds represented by the formula, wherein Z represents hydrogen atom or methyl, ethyl, methoxy or ethoxy group, each $R_1$ and $R_2$ represents methyl or ethyl group, $R_3$ represents methyl, ethyl or phenyl group or a phenyl group substituted by methyl, ethyl, methoxy or ethoxy group.

2. The mixture according to claim 1, which comprises a compound of the formula,

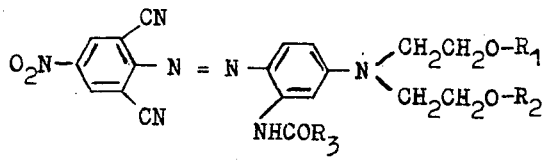

wherein $R_1$, $R_2$ and $R_3$ are as defined in claim 1, and a compound of the formula,

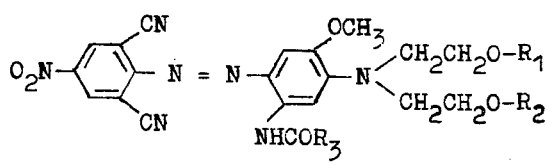

wherein $R_1$, $R_2$ and $R_3$ are as defined in claim 1.

3. The mixture according to claim 1, which comprises a compound of the formula,

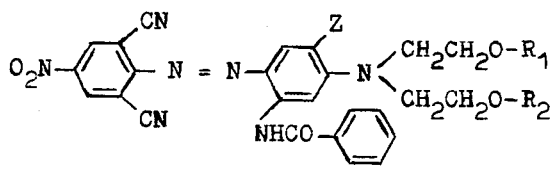

wherein $R_1$, $R_2$ and Z are as defined in claim 1, and a compound of the formula,

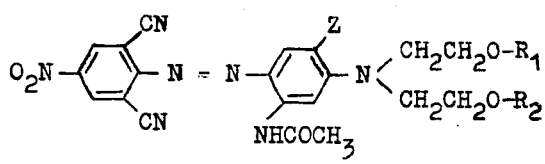

wherein $R_1$, $R_2$ and Z are as defined in claim 1.

4. The mixture according to claim 3, wherein each Z is hydrogen atom.

5. The mixture according to claim 1, wherein the mixing ratio by weight of one to another is 80:20 to 20:80.

6. A method for dyeing or printing hydrophobic fibers, characterized by using a mixture of at least two members selected from the group consisting of compounds represented by the formula,

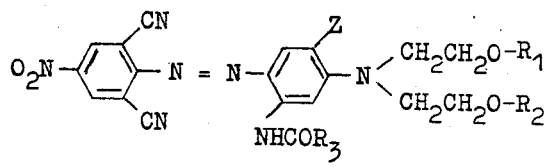

wherein Z represents hydrogen atom or methyl, ethyl, methoxy or ethoxy group, each $R_1$ and $R_2$ represents methyl or ethyl group, $R_3$ represents methyl, ethyl or phenyl group or a phenyl group substituted by methyl, ethyl, methoxy or ethoxy group.

7. The method according to claim 6, wherein the mixture comprises a compound of the formula,

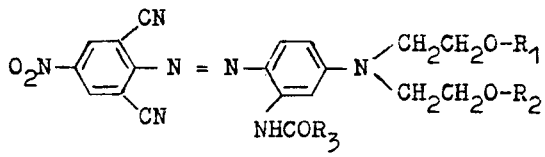

wherein $R_1$, $R_2$ and $R_3$ are as defined in claim 6, and a compound of the formula,

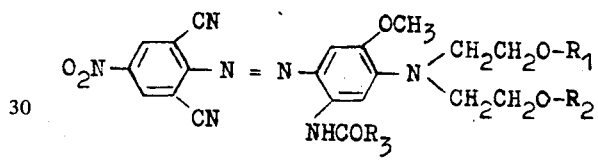

wherein $R_1$, $R_2$ and $R_3$ are as defined in claim 6.

8. The method according to claim 6, wherein the mixture comprises a compound of the formula,

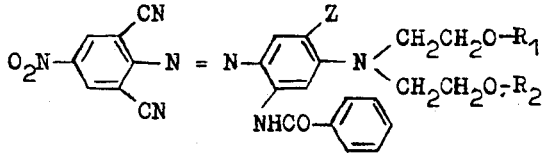

wherein $R_1$, $R_2$ and Z are as defined in claim 6, and a compound of the formula,

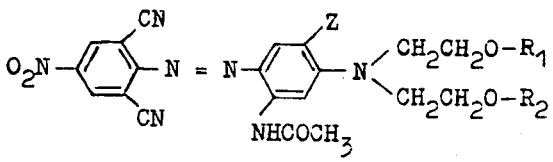

wherein $R_1$, $R_2$ and Z are as defined in claim 6.

9. The method according to claim 6, wherein the hydrophobic fiber is polyester fiber.

10. A hydrophobic fiber dyed by the method of claim 6.

* * * * *